United States Patent [19]

Amemiya

[11] 3,973,130

[45] Aug. 3, 1976

[54] APPARATUS FOR RECORDING INFORMATION ON A FILM

[75] Inventor: Hiroshi Amemiya, Fujisawa, Japan

[73] Assignee: Tokyo Shibaura Electric Co., Ltd., Kawasaki, Japan

[22] Filed: May 7, 1974

[21] Appl. No.: 467,834

[30] Foreign Application Priority Data

May 12, 1973 Japan.................. 48-52772
Nov. 5, 1973 Japan............... 48-123395

[52] U.S. Cl.................. 250/476; 354/105
[51] Int. Cl.² .......................... H05G 1/28
[58] Field of Search.............. 250/476; 354/105

[56] References Cited
UNITED STATES PATENTS

| 3,683,182 | 8/1972 | Farmer | 250/476 |
| 3,710,696 | 1/1973 | Tucker | 354/105 |
| 3,827,070 | 7/1974 | Hoerenz | 354/105 |

*Primary Examiner*—Craig E. Church
*Attorney, Agent, or Firm*—Oblon, Fisher, Spivak, McClelland & Maier

[57] ABSTRACT

An apparatus for recording information on a film comprising a recording head selectively excited by an electrical control signal to give forth light information bearing a prescribed pattern as a whole from a light-emitting surface and an X-ray or light shield, said recording head and shield are so disposed as to face both sides of the film whereby the sensitization of the film by X-ray or light emitted from one side of the film is partly obstructed by the shield, and information is recorded on said obstructed portion of the surface of the flim by the recording head.

7 Claims, 10 Drawing Figures

U.S. Patent  Aug. 3, 1976  Sheet 1 of 2  3,973,130

APPARATUS FOR RECORDING INFORMATION ON A FILM

BACKGROUND OF THE INVENTION

This invention relates to an apparatus for recording information bearing a prescribed pattern on a film by a light signal.

Hitherto, impression of a patient's identification mark on a film in X-ray photography has been carried out by one of the following two processes. The first process consists in fixing by adhesive tape a metal piece representing a character or notation and consisting of an X-ray shielding material, for example, lead to part of a cassette previously attached to a separate X-ray film and printing said character or notation on the film by obstruction of X-rays when the affected part of a patient is photographed by X-rays. The second process is to write information or a patient's identification mark on a piece of paper by pencil, inserting said paper into part of a cassette, emitting a different form of light from X-rays on said information and printing the illuminated information on the X-ray film.

In each practical X-ray photography, characters or notations identifying a patient are, as a rule, manually changed from one patient to another. Therefore, this operation is not only time-consuming but also inefficient. Since a large number of films received in a magazine particularly for use with a recent X-ray apparatus for medical treatment have to be attached one by one to a repeatedly used cassette for each time of X-ray photography, impression of a patient's identification mark on the X-ray film by any of the above-mentioned processes is indeed troublesome.

SUMMARY OF THE INVENTION

It is accordingly the object of this invention to provide an apparatus capable of recording on an X-ray film any form of information consisting of characters, notations or a combination thereof bearing a prescribed pattern without the necessity of carrying out a time-consuming operation.

The recording apparatus of this invention enables information or a patient's identification mark to be impressed on an X-ray film with a high degree of resolution by an externally supplied electrical control signal. Further, the subject apparatus is of sufficiently simple construction to admit miniaturization and automatic operation.

BRIEF DESCRIPTION OF THE DRAWINGS

FIGS. 3A and 3B jointly present a modification of the recording head wherein FIG. 3A is an oblique view and FIG. 3B is a cross sectional view at line 3B—3B of FIG. 3A;

FIGS. 4A and 4B jointly indicate another modification of the recording head wherein FIG. 4A is an oblique view and FIG. 4B is a cross sectional view at line 4B—4B of FIG. 4A.

DESCRIPTION OF THE PREFERRED EMBODIMENTS

There will now be described information-recording apparatus according to the preferred embodiments of this invention by reference to the appended drawings.

Figure 1:
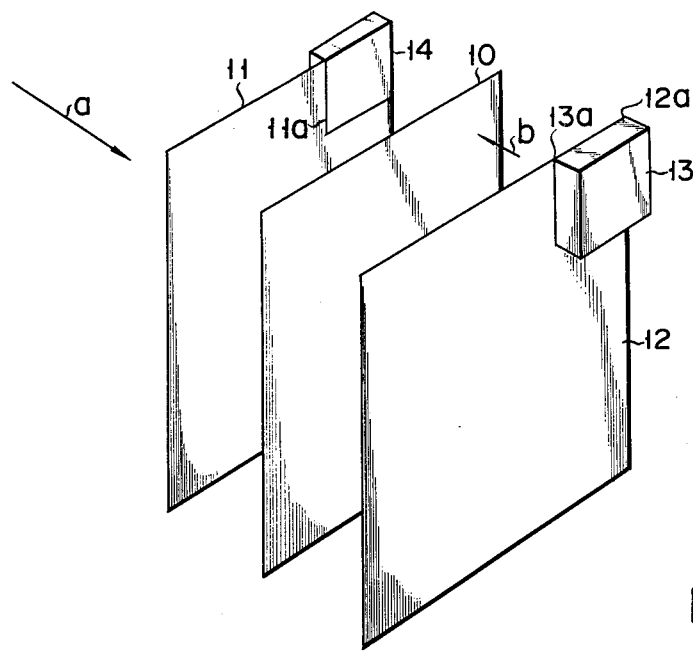
FIG. 1 is an oblique view of a recording apparatus according to an embodiment of this invention, showing the manner in which the apparatus is applied.

Referring to FIG. 1, numeral 10 shows a film used in ordinary X-ray photography. Two sensitized sheets 11, 12 are closely pressed against both sides of the film 10 by an external force. When X-rays are emitted to the film 10 through a foreground subject and the sensitized sheet 11 in turn, then the image of the foreground subject is impressed on the film 10. An X-ray photographic process using these film 10 and sensitized sheets 11, 12 is already known to this particular field, and description thereof is omitted.

An opening 12a is formed in one corner of the sensitized sheet 12 pressed on the opposite side of the film 10 to that to which X-rays are emitted. The later described recording head 13 is fitted into said opening 12a with the recording or light-emitting surface of said head 13 positioned to face the film 10. The recording head 13 may be attached to the sensitized sheet 12 by proper means, for example, adhesive. The sensitized sheet 11 pressed on that side of the film 10 to which X-rays are emitted is also provided with a similar opening 11a in the corner corresponding to the aforesaid opening 12a. Fitted into the opening 11a is an X-ray shield 14 made of, for example, lead and formed in the same shape as the recording surface 13a of the recording head 13.

Figure 2:
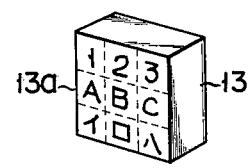
FIG. 2 is an oblique view of the recording head of the apparatus of FIG. 1.

The recording head 13 includes a specified number of optical display devices each formed of numerous light-emitting diodes. When supplied with an electrical control signal, the selected one or more of the display devices emit light in a prescribed character pattern. According to the embodiment of FIG. 1, the recording head 13 has nine optical display devices arranged in the matrix form as illustrated in FIG. 2. Each optical display device may consist of a known 7-segment numeral display means having seven light-emitting diodes arranged in a prescribed formation and/or a character display means having 5 ×7 light-emitting diodes assembled in the matrix form. When the light-emitting diodes are selectively excited by an external control signal, the above-mentioned numeral or character display means optically indicates a prescribed numeral or character.

When X-rays are emitted through a foreground subject (not shown) in the direction of the arrow a indicated in FIG. 1, the sensitized sheets 11, 12 of the recording apparatus constructed as described above give forth fluorescent light, which in turn optically acts on the X-ray film 10. At this time, that portion of the X-ray film 10 which faces the X-ray shield 14 remains nonsensitized due to the obstruction of X-rays. When, therefore, the recording head 13 is excited by an external control signal, for example, an information signal treated by a computer to give forth a prescribed light signal from its light-emitting surface 13a in the direction of the arrow b indicated in FIG. 1, then the information represented by said light signal is impressed on the nonexposed portion of the X-ray film 10.

When the exposed film is released from the sensitized sheets 11, 12 upon completion of the X-ray photography and the recording of information and replaced by a fresh film, then succeeding recording is made by another control signal and different information can be impressed on the fresh film. Accordingly, the recording apparatus of this invention enables different pieces of information to be successively impressed on separate films as often as required through simple operation merely by supplying different control signals. Moreover, the recording head 13 impresses information on X-ray films in a state contacting or substantially contacting them and attains prominent resolution, completely eliminating the necessity of using any optical lens for the focusing of a light pattern. The recording head 13 including semiconductor elements is of simple arrangement and formed in a small size with light weight, admitting of easy handling.

Figure 3A:
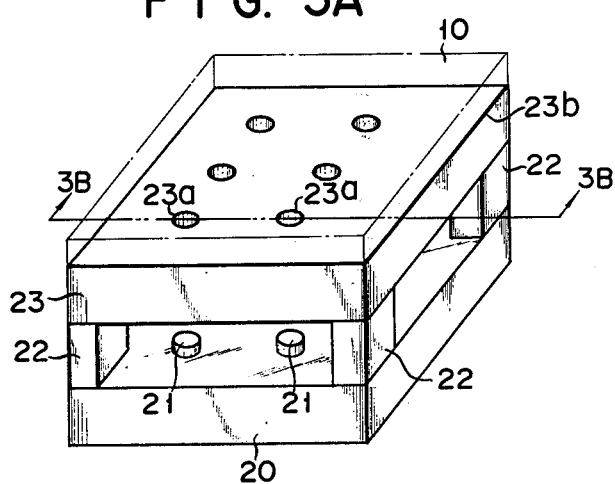

There will now be described the optical display devices constituting the recording head 13. Referring to an optical display device shown in FIGS. 3A and 3B, a prescribed number of light-emitting diodes 21 are arranged in a specified pattern on an insulating substrate 20 made of ceramic material. These light-emitting diodes 21 consist of known types each measuring about 1 millimeter in size and are connected to an intermittent excitation circuit (not shown). In practical application, only selected ones of said diodes 21 emit light, and an aggregate of emitted dot lights constitutes a prescribed optical pattern. A light shield 23 is positioned parallel to the substrate 20 at a prescribed interval by means of spacers 22. The light shield 23 is bored with as many vertical holes 23a as the light-emitting diodes 21 at the points facing them. The light shield 23 is formed of light-obstructing material, for example, bakelite, preventing light emitted from the diodes 21 from being projected above said light shield 23 except through the vertical holes 23a. The cross sectional area, shape and size of the vertical holes 23a are not limited by those of the light-emitting diodes 21 but may take a circular, rectangular or any other form and also be smaller or larger than said diodes 21.

Figure 3B:
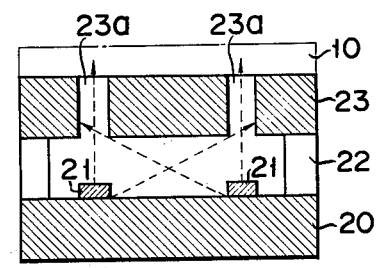

The interval between the substrate 20 and light shield 23 may be optionally chosen. If, however, said interval is made considerably narrow as shown in FIG. 3B, then light emitted from the selected diodes 21 will reach the upper surface 23b of the light shield 23 (which constitutes the light-emitting or recording surface of the recording head 13) only through the prescribed vertical holes 23a corresponding to said selected diodes 21 to form the subject matter of information being recorded, thereby causing light emitted from any other diode, should it happen to be excited, to be absorbed at the intermediate part of the corresponding vertical hole 23a or on the underside of the light shield 23.

With the optical display device of the above-mentioned arrangement, the light-emitting surface 23b of the perforated light shield 23 is brought into direct contact with the X-ray film 10, thereby enabling information bearing a prescribed pattern to be recorded on the film 10 with a high degree of resolution. In this case, the light-emitting diodes do not directly contact the film 10 and are saved from the damage which might otherwise occur by said contact.

Figure 4A:
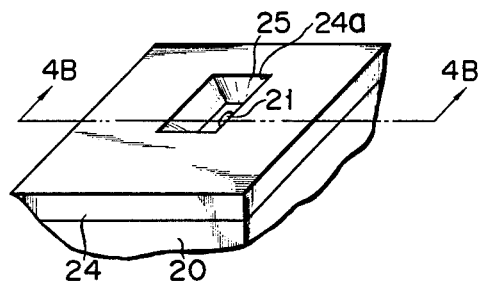
Figure 4B:
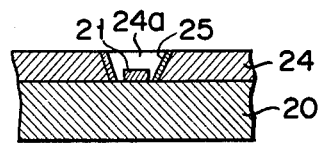

The optical display device may further be constructed as shown in FIGS. 4A and 4B. According to this modification a light-impermeable protective layer 24 made of synthetic resin is mounted immediately on the substrate 20. Light-emitting diodes 21 are received in holes 24a bored in the protective layer 24, which is formed thicker than the light-emitting diodes 21 to prevent them from projecting above the surface of said layer 24. Each hole 24a has its side walls outwardly inclined with the diameter progressively enlarged toward the light-emitting surface, namely, in the inverted flare form. The inclined side walls are fitted with aluminium-plated reflector plates 25.

Figure 5:
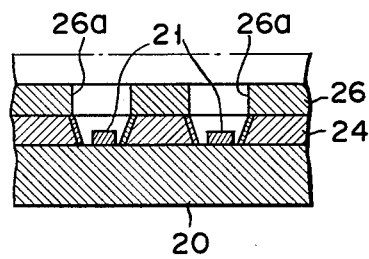
FIGS. 5 to 8 are cross sectional views of other modifications of the recording head.

The optical display device of FIGS. 4A and 4B may be modified as shown in FIG. 5. Namely, it is possible to superpose on the protective layer 24 another protective layer 26 bored with holes 26a at the points facing the aforesaid holes 24a.

Figure 6:
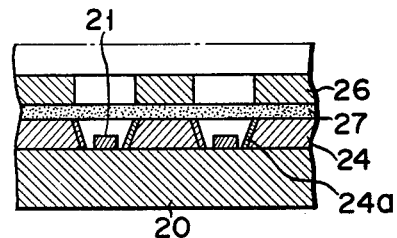

According to a further modification of the optical display device shown in FIG. 6, a light-permeable plate 27 is interposed between the first protective layer 24 and the second protective layer 26 so as to cover the holes 24a and thereby prevent the light-emitting diodes 21 from being contaminated by foreign matter which should happen to enter the holes 24a.

Figure 7:
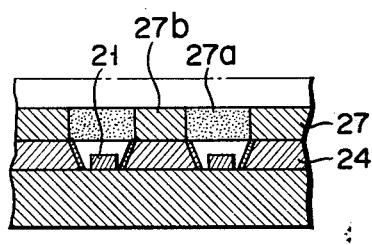

According to still further modification of the optical display device shown in FIG. 7, a second protective layer 27 is mounted on the first protective layer 24 to prevent foreign matter from entering the holes 24a of the first protective layer 24. Those portions of the second protective layer 27 which are disposed above the holes 24a are made of light-permeable material 27a and the other portions of said layer 27 are formed of light-impermeable material 27b. Accordingly, light from the light-emitting diodes 21 passes through the light-permeable material 27a of the second protective layer 27 and is given forth to the outside from the light-emitting surface of the optical display device. The light-permeable material 27a is prepared by first forming a light-impermeable material and then chemically treating the prescribed parts of said light-impermeable material to render them light-permeable.

Figure 8:
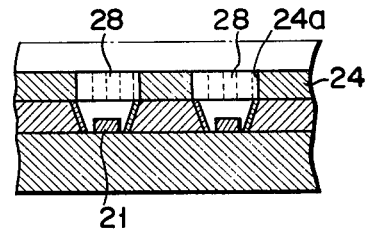

According to a further modification of the optical display device shown in FIG. 8, a bundle of optical fibers 28 is inserted into the holes 24a of the first protective layer 24, thereby causing light from the light-emitting diodes 21 to be sent forth to the outside through said bundle of optical fibers 28.

The foregoing description refers to the case where the light-emitting diodes of the optical display device are not exposed to the light-emitting surface of said display device. However, it will be understood that this invention is not limited to the optical display device of such construction.

The recording apparatus of this invention has been described in connection with its application particularly to X-ray photography for medical treatment. However, the subject apparatus is also available for other uses, provided a film is sensitized by electromagnetic waves derived from, for example, light.

What is claimed is:

1. An apparatus for recording information on X-ray film comprising:

a pair of sensitized sheets for covering both sides of a sheet of photographic film to impress an image on said film in response to X-rays impinging on at least one of said sheets, an opening formed in corresponding corners of both of said sensitized sheets, an X-ray shield fitted into said opening in one of said sensitized sheets, a recording head fitted into said opening in said other sensitized sheet, said recording head including a plurality of light-emitting diodes arranged in a prescribed pattern, a substrate on which said light-emitting diodes are mounted, and a light-impermeable plate provided with a light-emitting surface and bored with vertical holes for passing light emitted by said light-emitting diodes to impress optical information bearing a prescribed pattern on a part of the surface of said film contacting said light-emitting surface, said holes of said light-impermeable plate having side walls outwardly inclined with the diameter progressively enlarged toward said light emitting surface, said inclined side walls being fitted with light reflecting plates and said light-emitting diodes being received in said holes so as not to project above said light-emitting surface.

2. An apparatus according to claim 1, wherein the optical shield is a plate member provided in close contact with the film to obstruct the emission of X-rays to the film.

3. An apparatus according to claim 1, wherein said light-impermeable plate is positioned above said light emitting diodes and spaced from said substrate.

4. An apparatus according to claim 1 wherein said light impermeable plate includes a first layer disposed on said substrate and a second layer superposed on said first layer provided with said light-emitting surface and said holes, said first layer having holes for receiving said light-emitting diodes and having outwardly inclined side walls.

5. An apparatus according to claim 4 wherein said holes of said second layer are filled with light-permeable material.

6. An apparatus according to claim 4, wherein said recording head has a light-permeable protective layer interposed between said first and second layers to cover said holes of said first layer.

7. An apparatus according to claim 4, wherein a bundle of optical fibers extending from said light-emitting diodes to said light-emitting surface is inserted in said holes of said second layer.

* * * * *